United States Patent Office 2,949,459
Patented Aug. 16, 1960

2,949,459

1,3-DI-SUBSTITUTED PHENYL-2-THIOUREAS

Renat Herbert Mizzoni, Long Valley, N.J., assignor to Ciba Pharmaceutical Products, Inc., Summit, N.J., a corporation of New Jersey No Drawing. Filed Jan. 26, 1959, Ser. No. 788,755

7 Claims. (Cl. 260—240)

The present invention concerns thiourea compounds. More particularly, it relates to 1,3-diphenyl-2-thioureas, in which one of the phenyl radicals contains in the 4-position a group of the formula Py—$[C(R)=CH]_n$—, in which Py stands for a pyridyl group, R represents hydrogen, lower alkyl or monocyclic carbocyclic aryl, and $n$ represents a whole number from 1 to 2, and the other phenyl radical contains in the 4-position an alkoxy group containing from 4 to 5 carbon atoms or an N,N-di-lower alkyl-amino-lower alkoxy group, salts thereof and process for the preparation of such compounds.

A pyridyl radical represents 3-pyridyl, 4-pyridyl, or particularly 2-pyridyl, which may be unsubstituted or may contain lower alkyl radicals, e.g. methyl or ethyl; nitro or amino groups, or halogen atoms, e.g. chlorine or bromine, as substituents. The radical R stands primarily for hydrogen; it may also represent lower alkyl, e.g. methyl or ethyl. Furthermore, a monocyclic carbocyclic aryl radical, e.g. phenyl or phenyl substituted by halogen, e.g. chlorine or bromine, or lower alkoxy, e.g. methoxy or ethoxy, may be anticipated as a radical R.

An N,N-di-lower alkyl-amino-lower alkoxy group is represented, for example, by 2-dimethylaminoethoxy or 2-diethylaminoethoxy. An alkoxy group having from 4 to 5 carbon atoms, is represented by n-butyloxy, isobutyloxy, secondary butyloxy, n-pentyloxy or isopentyloxy.

Salts are particularly the therapeutically acceptable acid addition salts with inorganic acids, such as, for example, hydrochloric, hydrobromic, sulfuric or phosphoric acids, or organic acids, such as, for example, acetic, hydroxyacetic, oxalic, maleic, tartaric, citric, benzoic, salicylic, 4-amino-salicylic, methane sulfonic acid or the like.

It has been found that the compounds of this invention and the salts thereof have remarkable tuberculostatic effects coupled with a low degree of toxicity and are, therefore, intended to be used as tuberculostatic agents of low toxicity in the treatment of infections caused by *Mycobacterium tuberculosis,* such as the human pathogenic strain H 37 Rv of *Mycobacterium tuberculosis.* A particularly outstanding activity is shown by 1,3-phenyl-2-thioureas, in which one of the phenyl radicals contains in the 4-position a 2-(2-pyridyl)-ethenyl group and the other phenyl radical contains in the 4-position an alkoxy radical having from 4 to 5 carbon atoms.

The new compounds may be used as tuberculostatic medicaments in the form of pharmaceutical preparations, which contain the new compounds or salts thereof in admixture with a pharmaceutical organic or inorganic, solid or liquid carrier suitable for enteral, e.g. oral, or parenteral administration. For making up such preparations there may be employed inert carrier substances, such as water, gelatine, lactose, starches, stearic acid, magnesium stearate, stearyl alcohol, talc, vegetable oils, benzyl alcohols, gums, waxes, propylene glycol, polyalkylene glycols, petroleum jelly or other substances used in medicaments. The pharmaceutical preparations may be in solid form, for example, as tablets, dragees or capsules, or in liquid form, for example, as solutions, emulsions or suspensions. If desired, they may contain auxiliary substances, such as preserving agents, stabilizing agents, wetting or emulsifying agents, salts for varying the osmotic pressure or buffers. They may also contain, in combination, other therapeutically useful substances, particularly other tuberculostatic agents, such as streptomycin, dihydrostreptomycin, isonicotinic acid hydrazide, 4-aminosalicyclic acid, other thiourea derivatives, etc.

The 2-thioureas of this invention may be prepared by reacting a phenylisothiocyanate, which contains in the 4-position an alkoxy group having from 4 to 5 carbon atoms or an N,N-di-lower alkyl-amino-lower alkoxy group, with an aniline, which contains in the 4-position a group of the formula Py—$[C(R)=CH]_n$— in which Py, R and $n$ have the above-given meaning, or a salt thereof, and, if desired, converting a resulting salt into a free base, and/or, converting a resulting base into a salt thereof.

The reaction is preferably carried out in the presence of a solvent, such as a lower alkanol, e.g. methanol or ethanol; a lower alkanone, e.g. acetone or ethyl methyl ketone; or an ether, e.g. p-dioxane. It may be performed at room temperature, or, if desired, at an elevated temperature, for example, under reflux, with lower reaction time.

The starting materials are readily obtained in quantities; for example, the 4-[2-(2-pyridyl)-ethenyl]-aniline can be prepared by reacting 4-nitro-benzaldehyde with α-picoline in the presence of acetic anhydride and subsequently hydrogenating the nitro to the amino group.

Depending on the conditions, the 1,3-diphenyl-2-thiourea compounds of this invention are obtained in the form of the free bases or as the salts thereof. A salt is converted into the free base, for example, by treatment with an aqueous alkaline reagent, such as an alkali metal hydroxide, e.g. lithium, sodium or potassium hydroxide; an alkali metal carbonate, e.g. lithium, sodium or potassium carbonate or hydrogen carbonate; or ammonia. A free base may be converted into a salt thereof, for example, by reacting a solution of the base in a solvent, such as a lower alkanol, e.g. methanol or ethanol, with the acid or a solution thereof. Bases or salts may be obtained in hydrated form; mono- or polysalts may be formed.

This is a continuation-in-part application of my application Serial No. 776,759, filed November 28, 1958 (now abandoned).

The following examples illustrate the invention; temperatures are given in degrees centigrade.

*Example 1*

A solution of 7.9 g. of 4-[2-(2-pyridyl)-ethenyl]-aniline and 8.9 g. of 4-isopentyloxy-phenylisothiocyanate in a mixture of 20 ml. of methanol and 50 ml. of ethanol is refluxed on the steam bath for 3½ hours. The white precipitate, formed upon chilling, is filtered off and recrystallized from a mixture of isopropanol and ethanol to yield 6 g. of 1-(4-isopentyloxy-phenyl)-3-{4-[2-(2-pyridyl)-ethenyl]-phenyl}-2-thiourea, M.P. 143.5–146°.

The hydrochloride of 1-(4-isopentyloxy-phenyl)-3-{4-[2-(2-pyridyl)-ethenyl]-phenyl}-2-thiourea may be prepared by treating an ethanol solution of the free base with hydrogen chloride and diluting the solution with ether.

*Example 2*

7.9 g. of 4-[2-(2-pyridyl)-ethenyl]-aniline is dissolved in a mixture of 120 ml. of methanol and 75 ml. of ethanol, 10.5 g. of 4-isobutyloxy-phenylisothiocyanate is added to the warm solution, and the mixture is refluxed for three hours on the steam bath. The solution is concentrated to one-third of its original volume, the precipitate is filtered off after chilling and is washed with isopropanol. The resulting 1-(4-isobutyloxy-phenyl)-3-{4-[2-(2-pyridyl)ethenyl]-phenyl}-2-thiourea is recrystallized from aqueous methanol, M.P. 139°.

Example 3

A mixture of 7.9 g. of 4-[2-(2-pyridyl)-ethenyl]-aniline and 10.4 g. of 4-n-butyloxy-phenylisothiocyanate in 120 ml. of methanol is refluxed on the steam bath. A yellow precipitate forms after 5 minutes, and the reaction mixture is cooled after an additional two hours of refluxing. The solid material is filtered off and the 1-(4-n-butyloxy-phenyl)-3-{4-[2-(2-pyridyl)-ethenyl]-phenyl}2 - thiourea hemihydrate is recrystallized from anhydrous ethanol, M.P. 168–169°; yield: 11.0 g.

By substituting 4-[2-(4-pyridyl)-butadienyl]-aniline for the 4-[-2-(2-pyridyl)-ethenyl]-aniline in the above reaction the 1-(4-n-butyloxy-phenyl)-3-{4-[2-(4-pyridyl)-butadienyl]-phenyl}-2-thiourea can be obtained. The 4-n-butyloxy-phenyl-isothiocyanate may be replaced by 4-(2-diethylaminoethoxy)-phenyl-isothiocyanate to form the 1-[4-(2-diethylaminoethoxy) - phenyl] - 3-{4-[2-(2-pyridyl)-ethenyl]-phenyl} - 2 - thiourea according to the above-given procedure.

Example 4

A solution of 11.1 g. of 4-isopentyloxy-phenylisothiocyanate and 10.5 g. of 4-[2-methyl-2-(2-pyridyl)-ethenyl]-aniline in 100 ml. of anhydrous ethanol is refluxed for three hours, then filtered hot and the filtrate is chilled. The resulting 1-(4-isopentyloxy-phenyl)-3-{4-[2-methyl-2-(2-pyridyl)-ethenyl]-phenyl}-2-thiourea is filtered off, washed with a 1:1-mixture of ethanol and petroleum ether and recrystallized from isopropanol, M.P. 124.5–125.5°; yield: 15 g.

The starting material used in the above reaction may be prepared as follows: A mixture of 53.5 g. of 2-ethylpyridine, 75.6 g. of p-nitrobenzaldehyde and 52 g. of acetic acid anhydride is refluxed for seven hours. The cold mixture is poured into dilute aqueous hydrochloric acid, and made slightly basic with aqueous ammonia while stirring. The yellow 4-[2-methyl-2-(2-pyridyl)-ethenyl]-nitrobenzene is filtered off, washed, air dried and recrystallized from 95 percent ethanol, M.P. 98–100.5°; yield: 84 percent.

To a solution of 343 g. of stannous chloride in 535 ml. of concentrated aqueous hydrochloric acid is added 101 g. of 4-[2-methyl-2-(2-pyridyl)-ethenyl]-nitrobenzene; a light colored paste is formed and heating is continued for one and one-half hours. The mixture is chilled, filtered, the solid material is washed and added to concentrated aqueous hydrochloric acid. The resulting suspension is poured into aqueous sodium hydroxide, so that the final pH=10–11, and the precipitate is filtered off, washed thoroughly with water and dried on the funnel. The solid material is extracted with ethanol in a Soxhlet apparatus, the solvent is evaporated and the light tan-colored 4-[2-methyl-2-(2-pyridyl)-ethenyl]-aniline is recrystallized from isopropanol, M.P. 118.5°; yield: 43 g.

Example 5

A mixture of 10.4 g. of 4-isobutyloxy-phenylisothiocyanate and 10.5 g. of 4-[2-methyl-2-(2-pyridyl)-ethenyl]-aniline in 75 ml. of ethanol is refluxed for three hours. Crystals are formed upon chilling and adding isopropanol; the 1-(4-isobutyloxy-phenyl)-3-{4 - [2-methyl-2-(2-pyridyl)-ethenyl]-phenyl}-2-thiourea is filtered off, washed with isopropanol and then with pentane and recrystallized from isopropanol, M.P. 113–114°; yield: 11 g.

In the generally applicable reaction the aniline derivative and the phenylisothiocyanate may have the reversed substituent; for example, an aniline, which contains in the 4-position an alkoxy group having from 4 to 5 carbon atoms or an N,N-di-lower alkyl-amino-lower alkoxy group, or a salt thereof may be reacted with a phenylisothiocyanate, which contains in the 4-position a group of the formula Py—[C(R)=CH]$_n$—, in which Py and $n$ have the above-given meaning.

What is claimed is:

1. A member of the group consisting of 1,3-diphenyl-2-thiourea, in which one of the phenyl radicals is substituted in the 4-position by the group of the formula Py—[C(R)=CH]$_n$— in which Py stands for a member of the group consisting of 2-pyridyl, 3-pyridyl and 4-pyridyl, R represents a member of the group consisting of hydrogen and lower alkyl, and $n$ for a whole number from 1 to 2, and the other phenyl radical is substituted in the 4-position by a member of the group consisting of alkoxy having from 4 to 5 carbon atoms and N,N-di-lower alkyl-amino-lower alkoxy, and therapeutically acceptable acid addition salts thereof.

2. 1,3-diphenyl-2-thiourea, in which one of the phenyl groups is substituted in the 4-position by 2-(2-pyridyl)-ethenyl and the other phenyl group is substituted in the 4-position alkoxy having from 4 to 5 carbon atoms.

3. 1 - (4 - isopentyloxy - phenyl)-3 - {4-[2-(2-pyridyl)-ethenyl]-phenyl}-2-thiourea.

4. 1-(4 - isobutyloxy - phenyl) - 3 - {4-[2 - (2-pyridyl)-ethenyl]-phenyl}-2-thiourea.

5. 1-(4-n - butyloxy - phenyl - 3 - {4 - [2 - (2 - pyridyl)-ethenyl]-phenyl}-2-thiourea.

6. 1-(4-isopentyloxy-phenyl) - 3-{4 - (2 - methyl - 2-(2-pyridyl)-ethenyl]-phenyl}-2-thiourea.

7. 1-(4-isobutyloxy - phenyl)-3-{4-[2-methyl-2-(2-pyridyl)-ethenyl]-phenyl}-2-thiourea.

References Cited in the file of this patent

UNITED STATES PATENTS

| | | |
|---|---|---|
| 2,050,557 | Bockmuhl et al. | Aug. 11, 1936 |
| 2,820,039 | Doub et al. | Jan. 14, 1958 |

OTHER REFERENCES

Buu-Hoi et al.: J. of the Chem. Soc., pp. 1573–1581, part II (1955).